United States Patent
Bennett et al.

(10) Patent No.: US 9,222,739 B1
(45) Date of Patent: Dec. 29, 2015

(54) FOLLOWER AND METHODS FOR WEAPONS MAGAZINE

(71) Applicant: Magpul Industries Corp., Boulder, CO (US)

(72) Inventors: Brad Bennett, Lafayette, CO (US); Nicholas Kielsmeier, Denver, CO (US); Michael T. Mayberry, Denver, CO (US); Brian L. Nakayama, Arvada, CO (US); Felix M. Nuss, Boulder, CO (US)

(73) Assignee: MAGPUL INDUSTRIES CORP., Louisville, CO (US)

( * ) Notice: Subject to any disclaimer, the term of this patent is extended or adjusted under 35 U.S.C. 154(b) by 0 days.

(21) Appl. No.: 14/630,303

(22) Filed: Feb. 24, 2015

Related U.S. Application Data

(60) Provisional application No. 62/109,603, filed on Jan. 29, 2015.

(51) Int. Cl.
*F41A 9/70* (2006.01)
*B23P 15/22* (2006.01)

(52) U.S. Cl.
CPC .. *F41A 9/70* (2013.01); *B23P 15/22* (2013.01)

(58) Field of Classification Search
CPC ..... F41A 9/61; F41A 9/64–9/71; B23P 15/22
USPC .......................................................... 42/50
See application file for complete search history.

(56) References Cited

U.S. PATENT DOCUMENTS

| | | | |
|---|---|---|---|
| 1,858,862 A | 5/1932 | Loomis | |
| 2,441,735 A | 5/1948 | Warner | |
| 3,964,199 A | 6/1976 | Musgrave | |
| 4,205,474 A | 6/1980 | Musgrave | |
| 4,366,638 A | 1/1983 | Ketterer et al. | |
| 4,502,237 A | 3/1985 | Krogh | |
| 4,805,333 A * | 2/1989 | Doria et al. | 42/50 |
| 5,357,703 A | 10/1994 | Chesnut et al. | |
| 5,375,359 A | 12/1994 | Chesnut et al. | |
| 5,450,683 A * | 9/1995 | Miller, IV | 42/50 |

(Continued)

FOREIGN PATENT DOCUMENTS

| | | |
|---|---|---|
| EP | 2550500 A2 | 1/2013 |
| EP | 2208957 B1 | 4/2013 |
| WO | 2011159383 A3 | 8/2012 |

OTHER PUBLICATIONS

US P.A.L.M., "AK30-10 Black !10rd Magazine", Webpage found at https://uspalm.com/product/ak30-10-magazine-black/, Inventor(s) aware of prior art on or before Mar. 20, 2015 , p. 2 Published in: US.

(Continued)

*Primary Examiner* — Joshua Freeman
(74) *Attorney, Agent, or Firm* — Neugeboren O'Dowd PC

(57) ABSTRACT

A follower for a firearm magazine is provided. In some embodiments, the follower has: a platform shaped to interface with a firearm cartridge; a first side face extending longitudinally from the platform and having a first end opposing the platform; and a second side face extending longitudinally from the platform and having a second end opposing the platform. The first side face and the second side face may define a receiving space for receiving at least a portion of a magazine spring. At least one of the first end and the second end may have a nonlinear profile shaped to translate a lateral spring force into a longitudinal spring force.

17 Claims, 19 Drawing Sheets

(56) References Cited

U.S. PATENT DOCUMENTS

| | | | |
|---|---|---|---|
| 5,526,600 A * | 6/1996 | Chesnut et al. | 42/50 |
| 5,588,241 A * | 12/1996 | Hurley | 42/50 |
| 7,621,063 B2 * | 11/2009 | Fitzpatrick et al. | 42/50 |
| 8,069,601 B1 | 12/2011 | Fitzpatrick et al. | |
| 8,166,692 B2 | 5/2012 | Fitzpatrick et al. | |
| 8,347,774 B2 | 1/2013 | Rich | |
| 8,635,796 B2 | 1/2014 | Fitzpatrick et al. | |
| 8,677,880 B2 | 3/2014 | Bowles et al. | |
| 8,720,095 B2 | 5/2014 | Wright | |
| 8,739,446 B2 | 6/2014 | Sullivan et al. | |
| 8,813,406 B1 | 8/2014 | Sullivan et al. | |
| 8,839,543 B2 | 9/2014 | Fitzpatrick et al. | |
| 8,863,422 B2 | 10/2014 | Ballard | |
| D719,235 S * | 12/2014 | Mikroulis | D22/108 |
| 2007/0107592 A1 | 5/2007 | Snow | |
| 2009/0107022 A1 | 4/2009 | Fitzpatrick et al. | |
| 2010/0126053 A1 * | 5/2010 | Fitzpatrick et al. | 42/50 |
| 2010/0251590 A1 | 10/2010 | Fitzpatrick et al. | |
| 2010/0269389 A1 | 10/2010 | Lopez Laparra | |
| 2011/0079132 A1 | 4/2011 | Rich | |
| 2011/0113663 A1 | 5/2011 | Nakayama et al. | |
| 2011/0302816 A1 | 12/2011 | Fitzpatrick et al. | |
| 2012/0066950 A1 * | 3/2012 | Davidson | 42/50 |
| 2012/0073429 A1 | 3/2012 | Bowles et al. | |
| 2012/0131831 A1 | 5/2012 | Sullivan et al. | |
| 2012/0317857 A1 | 12/2012 | Fitzpatrick et al. | |
| 2013/0180146 A1 * | 7/2013 | Fitzpatrick et al. | 42/50 |
| 2014/0075808 A1 | 3/2014 | Ballard | |
| 2014/0075810 A1 * | 3/2014 | Mikroulis | 42/50 |
| 2014/0215877 A1 | 8/2014 | Sullivan et al. | |
| 2014/0215878 A1 | 8/2014 | Fitzpatrick et al. | |
| 2014/0352189 A1 | 12/2014 | Fitzpatrick et al. | |

OTHER PUBLICATIONS

TAPCO, "TAPCO AK Follower", Webpage found at http://cdn1.cheaperthandirt.com/ctd_images/bgprod/AKS-056.jpg, Inventor(s) aware of prior art on or before Mar. 20, 2015, p. 1 Published in: US.
Arsenal Inc. USA, "Arsenal Inc. USA Magazine Follower for 7.62 Magazines", Webpage found at http://ak-builder.com/index.php?dispatch=products.view&product_id=29988, Inventor(s) aware of prior art on or before Mar. 20, 2015, p. 1 Published in: US.
primaryarms.com, "WeaponTech AK47 Enhanced Bolt Hold Open", Webpage found at http://www.primaryarms.com/WeaponTech_AK47_Enhanced_Bolt_Hold_Open_Follower_p/afwtakf3.htm, Inventor(s) aware of prior art on or before Mar. 20, 2015, p. 3 Published in: US.

* cited by examiner

US 9,222,739 B1

FOLLOWER AND METHODS FOR WEAPONS MAGAZINE

PRIORITY

The present application claims priority from commonly owned and assigned provisional application No. 62/109,603, entitled Magazine Follower, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to firearms. In particular, but not by way of limitation, the present invention relates to systems and methods for improving firearm magazine assemblies.

BACKGROUND OF THE INVENTION

Generally, a firearm magazine assembly includes a housing with a feed end and an opposing end that encases a spring and follower assembly. The spring maintains pressure on the follower, causing the follower to bias cartridges towards the feed end as cartridges are emptied from or loaded into the magazine. The follower thus travels through the housing as the magazine is emptied of or filled with cartridges.

In some cases, as the magazine is being loaded with cartridges, and the spring is in the process of being compressed, the spring may catch on the follower, causing the spring to un-uniformly buckle or twist. This buckling or twisting reduces the reliability and/or the maximum compression of the spring. Reducing the maximum compression of the spring reduces the capacity of the magazine. An un-uniformly buckling spring may generally experience a reduction in longevity, increase the amount of maintenance required by the user, and/or increase the loading force required by the user.

Although present magazine assemblies and methods are functional, it is desirable to provide a magazine assembly that has improved reliability while loading the assembly. Accordingly, a system and method are needed to provide new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments provide a follower for a firearm magazine. The follower may have a platform shaped to interface with a firearm cartridge, a first side face extending longitudinally from the platform and having a first end opposing the platform, a second side face extending longitudinally from the platform and having a second end opposing the platform. The first side face and the second side face define a receiving space for receiving at least a portion of a magazine spring, and at least one of the first end and the second end has a nonlinear profile shaped to translate a lateral spring force into a longitudinal spring force.

Some embodiments provide a follower for a firearm magazine. The follower may have a cartridge interface shaped to support a cartridge in a firearm magazine, a magazine housing interface shaped to orient the follower relative to the firearm magazine, and a magazine spring receiving space. The magazine spring receiving space is shaped to receive at least a portion of a magazine spring, and at least a portion of the magazine spring receiving space has a nonlinear end profile shaped to translate a lateral spring force into a longitudinal spring force.

Some embodiments provide method of using a follower for a firearm magazine. The method may include providing a follower in a firearm magazine; causing the follower to interface with a cartridge, a magazine housing, and a magazine spring; and loading the firearm magazine such that the follower compresses the magazine spring and the nonlinear end profile deflects the magazine spring from catching on the nonlinear end profile. The follower has a cartridge interface, a magazine housing interface, and a magazine spring receiving space shaped to receive at least a portion of a magazine spring, at least a portion of the magazine housing interface comprising a plurality of interior faces and a nonlinear end profile shaped to deflect the magazine spring from catching on the follower.

In some embodiments, a method of making a follower for a firearm is provided. The method includes: providing a platform shaped to interface with a firearm cartridge, shaping a first side face extending longitudinally from the platform and having a first end opposing the platform, and shaping a second side face extending longitudinally from the platform and having a second end opposing the platform. The method also includes shaping the first side face and the second side face to define a receiving space for receiving at least a portion of a magazine spring, and shaping a nonlinear profile in at least one of the first end and the second end, so that the nonlinear profile nonlinear profile is shaped to translate a lateral spring force into a longitudinal spring force.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Prior to describing the embodiments in detail, it is expedient to define terms as used in this document. For the purpose of this document, relational terms such as, without limitation, "lateral", "longitudinal", "perpendicular", "parallel", and "flat" shall be understood to mean "within reasonable manufacturing tolerances accepted in the firearms manufacturing industry". The term "longitudinal" shall reference that direction associated with a typical direction of travel or intended travel of a follower and/or cartridges within a firearm magazine, even where no magazine is present. For example, in FIG. 1, axis A is a longitudinal axis. The term "lateral" may reference any direction that is not longitudinal. For example, in FIG. 8B, a lateral force F is marked, because the force F has lateral components. However, it should be noted that lateral force F also has longitudinal components. The term "fore" shall reference that side or direction associated with a firing direction or a nose of a cartridge, while the term "aft" shall reference that side or direction associated with a user position, away from a firing direction. For example, in FIG. 1, the left of the page illustrates the fore region of the follower 100, and the right side of the page illustrates the aft region of the follower 100. The term "exterior" shall reference that region intended to interface with a magazine housing, while the term "interior" shall reference that region intended to receive or house a spring compressed therein. For example, in FIG. 5, the reference "112" is directed towards a space that is interior of walls 104, 106. The term "nonlinear" shall be understood to mean having a curved region. For example, the profile labeled 111a in FIG. 3 may be considered a nonlinear end profile.

Figure 1:
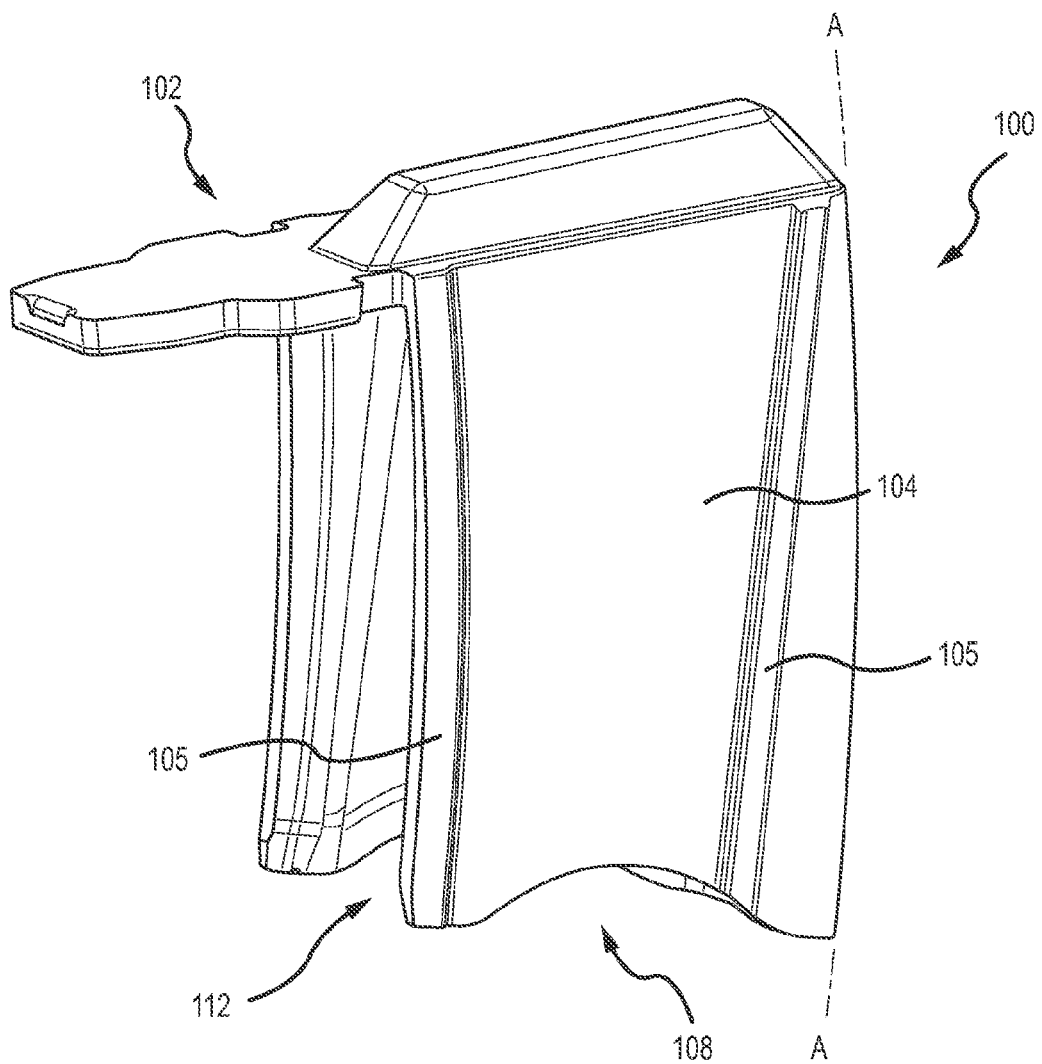
FIG. 1 is a front perspective view of a follower according to some embodiments.

Referring now to the drawings, where like or similar elements are designated with identical reference numerals throughout the several views, and referring in particular to FIG. 1, it illustrates a magazine follower 100 according to some embodiments. The follower 100 may be manufactured for use with a desired firearm type, such as the 7.62×39 Kalashnikov pattern rifles (AK-47, AKM, AKS, SIG556R), and others. It will be understood by one of skill in the art that the follower 100 may be manufactured for use with other firearms. The follower 100 may also be manufactured of any material suitable for use as a firearm follower, including, without limitation, high strength synthetic materials, plastics, composites, ceramics, various metals including aluminum, stainless steel or alloys, or any other material suitable for the intended use with a firearm, and the follower may have a surface finish suitable to minimize friction between the follower 100 and a magazine housing or spring.

Figure 2:
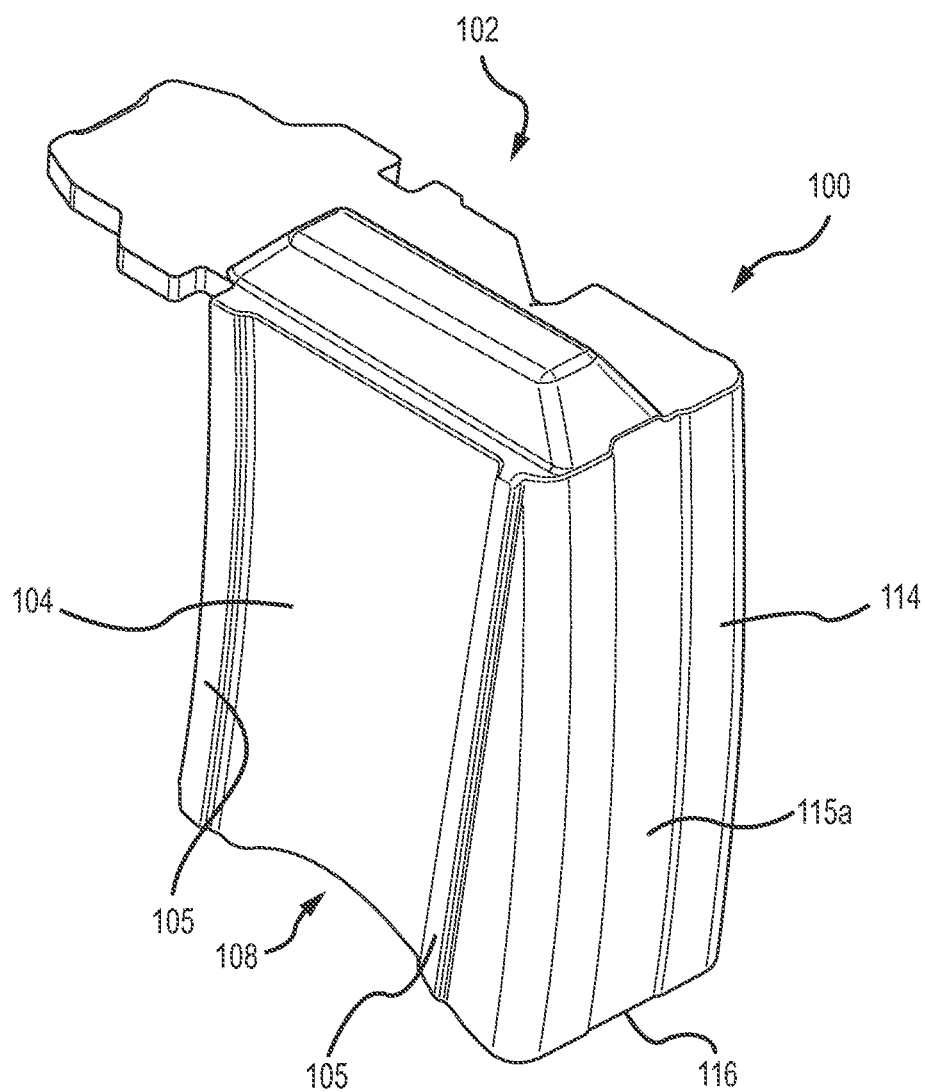
FIG. 2 is a rear perspective view of a follower according to some embodiments.
Figure 3:
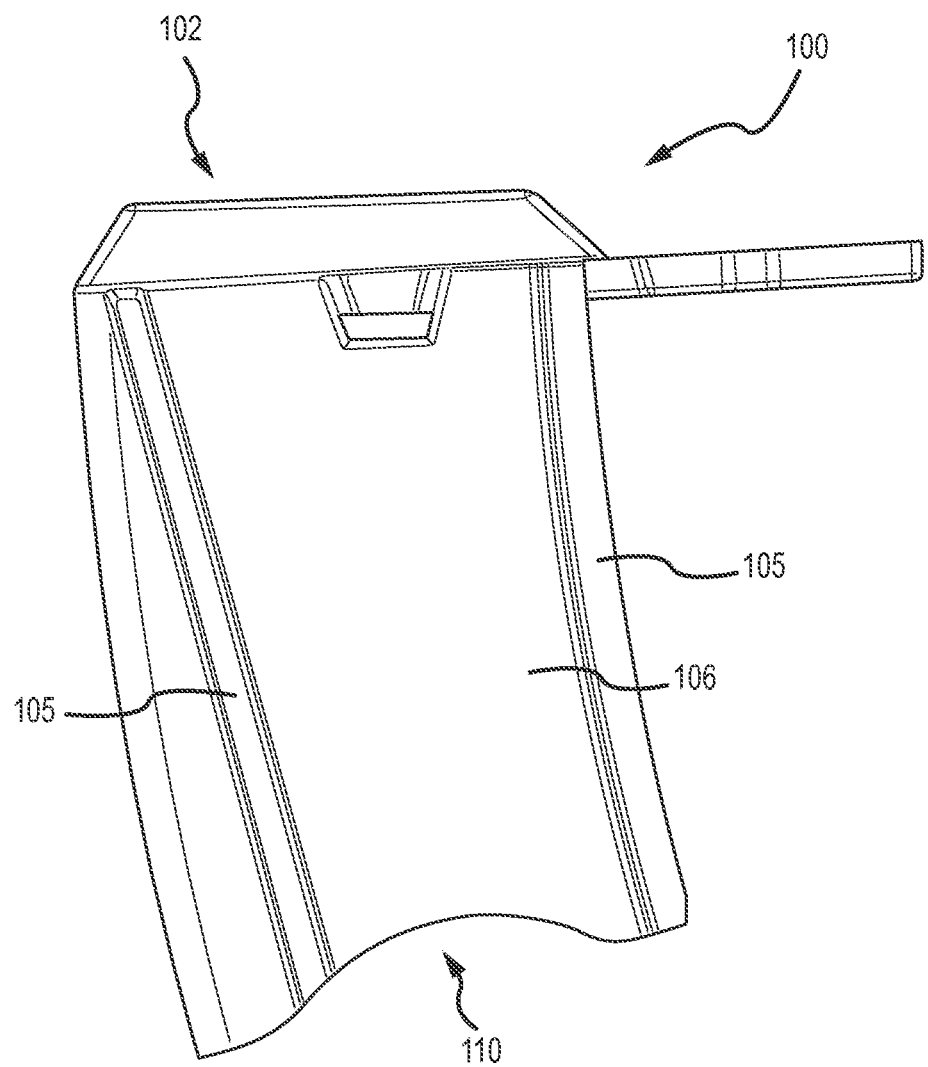
FIG. 3 is a side view of a follower according to some embodiments.

As illustrated in FIGS. 1-3, in some embodiments, the follower 100 has a cartridge interface shaped to support a cartridge in a firearm magazine, such as a platform 102 shaped to interface with a firearm cartridge. In some embodiments, the platform 102 may be shaped according to known designs suitable for use with a variety of firearms and cartridge specifications, such as, without limitation, 7.62×39 millimeter, 5.45×39 millimeter, 7.62×54R, 5.56×45 millimeter, 7.62×51 millimeter (0.308), 12 gauge, 9×18 millimeter, 0.22LR, or any rim fire cartridges, or others.

The follower 100 may also have a magazine housing interface shaped to orient the follower 100 relative to a firearm magazine, such as a first side face and a second side face. The first and second side faces may be defined by a plurality of walls, such as a first side wall 104, and a second side wall 106. The first and second side walls 104, 106 may be defined by a plurality of walls or a single shape formed to provide first and second side faces. The first and second side walls 104, 106 may have one or more guide structures 105 for orienting the follower 100 relative to a firearm magazine. The first and second side walls 104, 106 may be parallel to one another and/or mirror one another, and they may be perpendicular to a bottom face of the platform 102 or extend longitudinally from the platform 102, as illustrated in FIG. 4.

Figure 4:
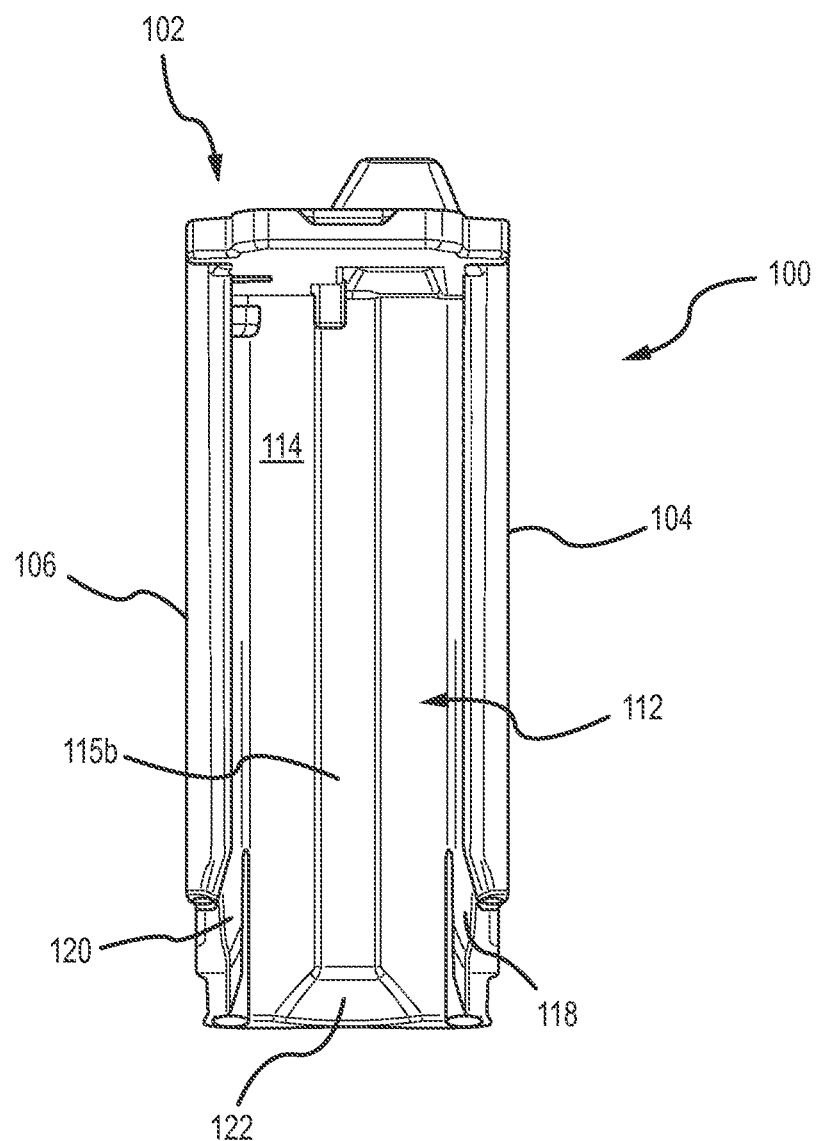
FIG. 4 is a front view of a follower according to some embodiments.

As illustrated in FIGS. 1 and 4, the follower 100 may have a magazine spring receiving space 112. In some embodiments, the receiving space 112 is defined by a single curved wall structure or a plurality of walls, such as the first and second side walls 104, 106 having side faces, with the spring receiving space 112 shaped to receive at least a portion of a magazine spring, such as when the spring and follower 100 are compressed in a magazine housing. The first side wall 104 may extend longitudinally from the platform 102 and have a first end 108 opposing the platform 102. Similarly, the second side wall 106 may extend longitudinally from the platform 102 and have a second end 110 opposing the platform 102. See e.g. FIGS. 1-2. Exterior faces of the first and second side walls 104, 106 may have guide structures 105 for maintaining a desired orientation between the follower 100 and a magazine housing, while interior faces of the first and second side walls 104, 106 may have one or more guide surfaces 107 to provide the spring a smaller surface on which to glide, thus reducing friction between the spring and the follower 100. See e.g. FIGS. 2 and 6.

Figure 8:
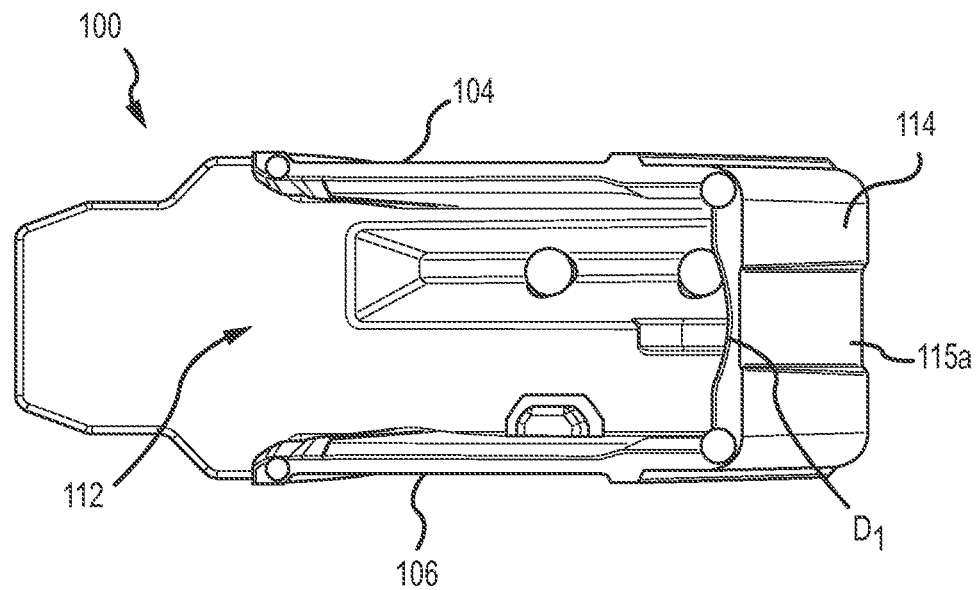
FIG. 8 is a bottom view of a follower according to some embodiments.
Figure 8A:
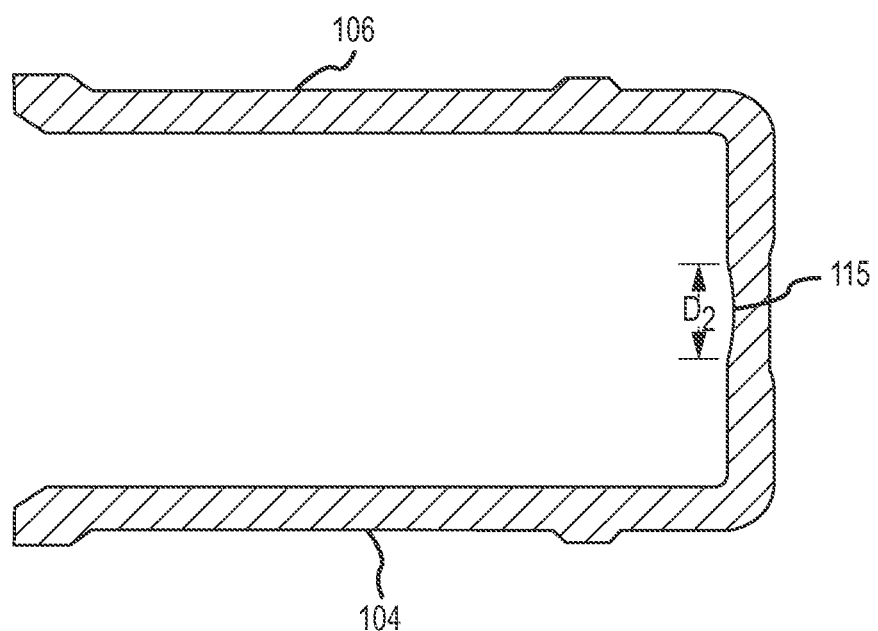
FIG. 8A is a bottom section view illustrating a feature of the recess illustrated in FIG. 8.
Figure 8B:
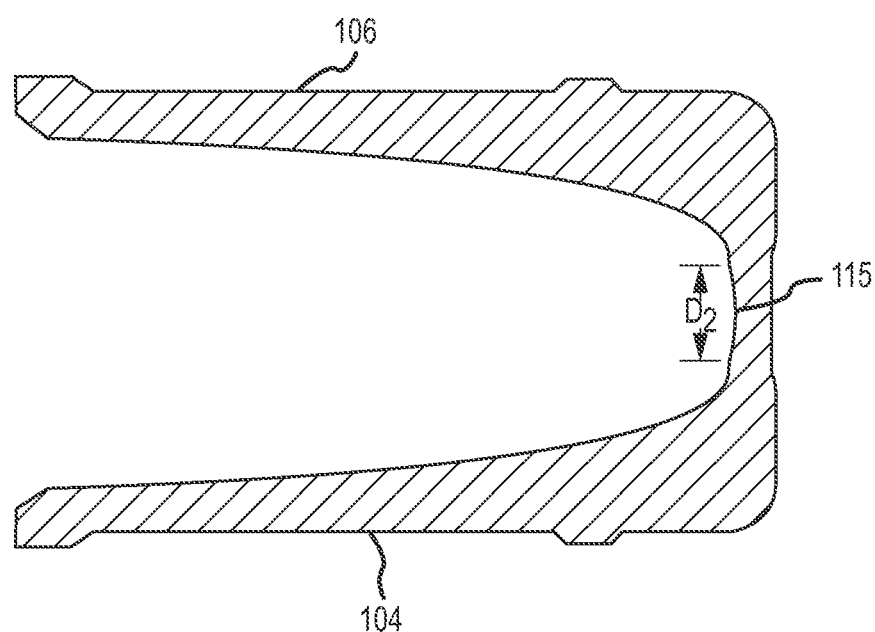
FIG. 8B is a bottom section view illustrating a receiving space according to some embodiments.

With brief reference to FIG. 8B, in some embodiments, the receiving space 112 may be defined by a single wall defining an interior face 124 that has at least two opposing points, at least two points mirrored about a central axis, or two opposing normals. For example, the receiving space 112 may be defined by a curved surface in some embodiments that encloses at least a portion of a spring compressed in the receiving space 112. The interior face 124 may be mirrored about a transverse axis B so as to form a first side face 204 and a second side face 206. The first and second side faces 204, 206 may function in a manner similar to the first and second side faces 104, 106. The first and second side faces 204, 206 may also have one or more end profiles 108, 110 and/or spring deflectors 118, 120 as described with reference to the first and second side faces 104, 106.

Figure 5:
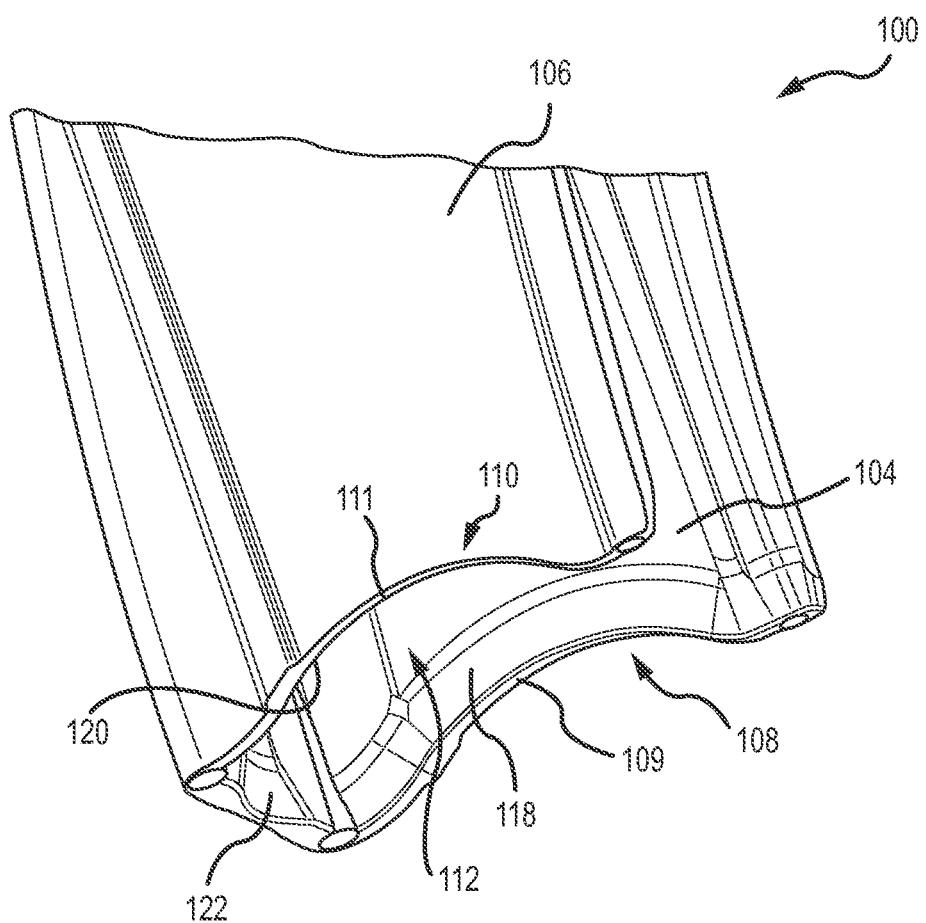
FIG. 5 is a detailed view illustrating lower portions of a follower according to some embodiments.

Turning now to FIG. 5, at least one of the plurality of walls may have a nonlinear end profile shaped to translate a lateral spring force into a longitudinal spring force. In some embodiments, a first end and a second end 108, 110 may have a nonlinear profile, the nonlinear profile having a concave portion 109, 111. The concave portion 109, 111 may serve to prevent a fore and/or aft region of the spring from catching on the walls 104, 106 of the follower 100 and/or to translate a lateral spring force into a longitudinal spring force, to allow the spring to properly compress as the magazine is being loaded.

Figure 5A:
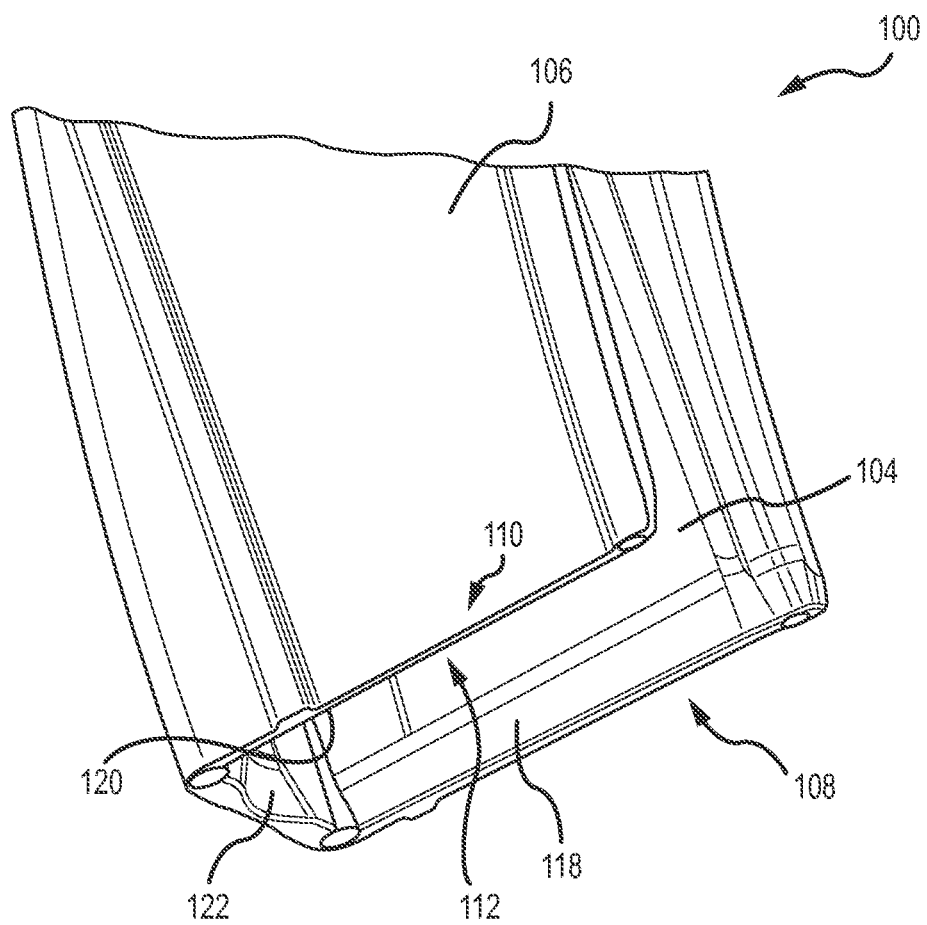
FIG. 5A is a detailed view illustrating alternative lower portions of a follower according to some embodiments.

It should be understood that, although both side walls 104, 106 are depicted with a concave portion 109, 111, the follower 100, 200 could comprise just one side wall with a concave portion 109, 111, or neither side wall 104, 106 could comprise the concave portion 109, 111. See FIG. 5A illustrating a follower 100 having spring deflectors 118, 120, 122 without a nonlinear profile or concave portion in the side walls or side faces 204, 206. Those of skill in the art will also understand that the concave portion 109, 111 may be suitably located in the follower 100 such that the concave portion 109, 111 is near the aft region of the magazine, as depicted in FIG. 5, to address the regions of the spring that experience the greatest lateral displacement or are susceptible to binding on the follower.

Figure 5B:
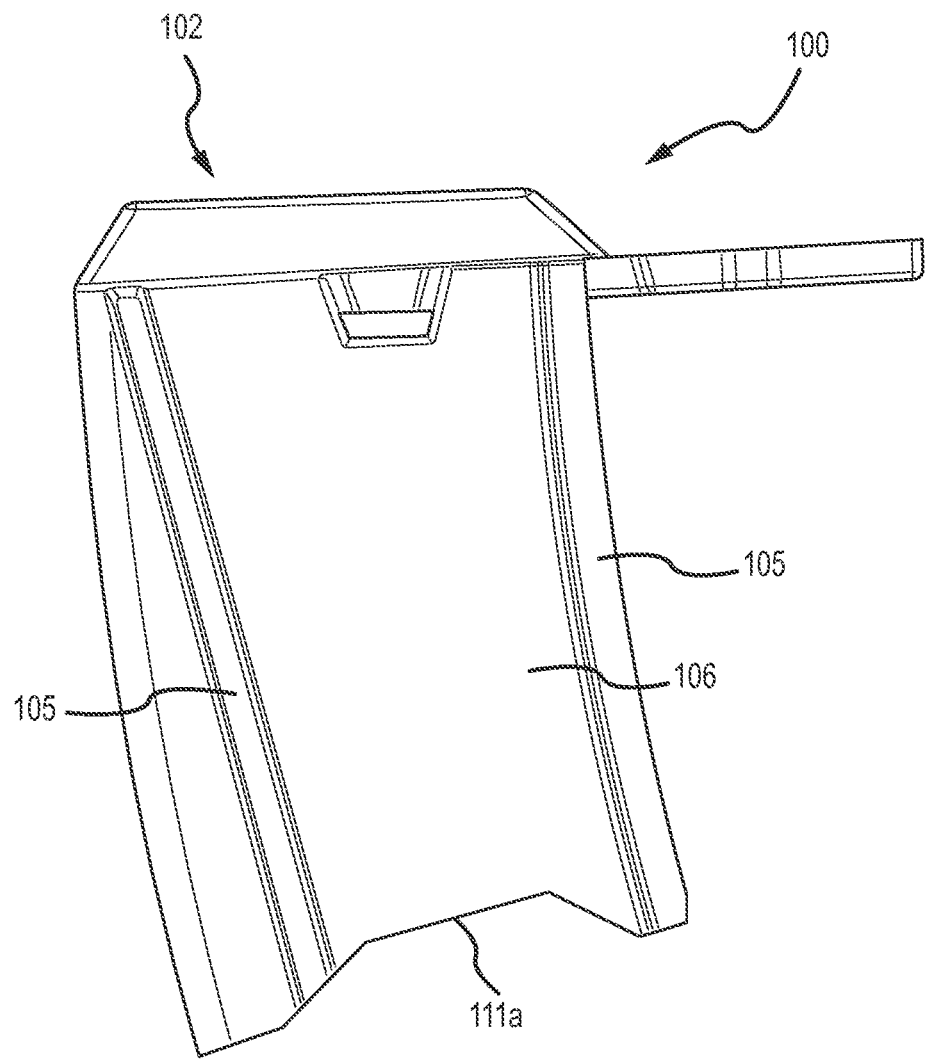
FIG. 5B is a side view illustrating alternative lower portions of a follower according to some embodiments.
Figure 5C:
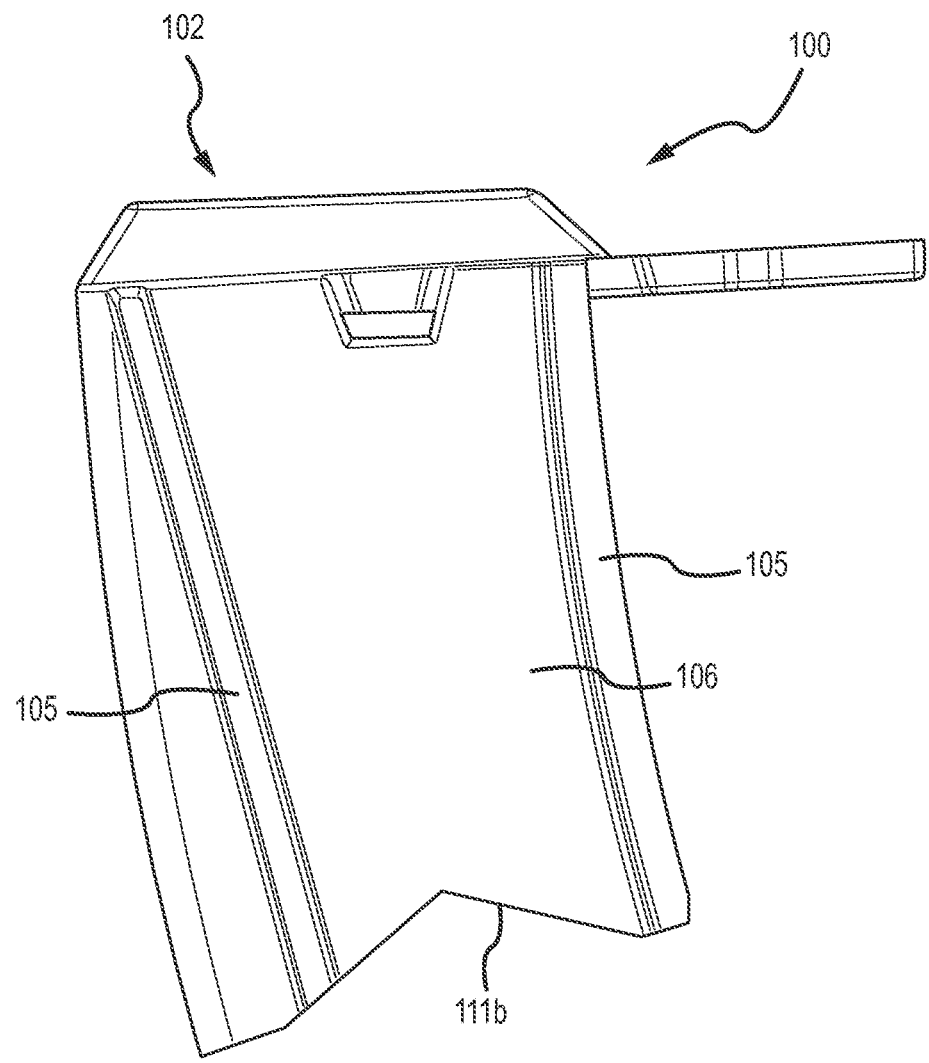
FIG. 5C is a side view illustrating alternative lower portions of a follower according to some embodiments.
Figure 5D:
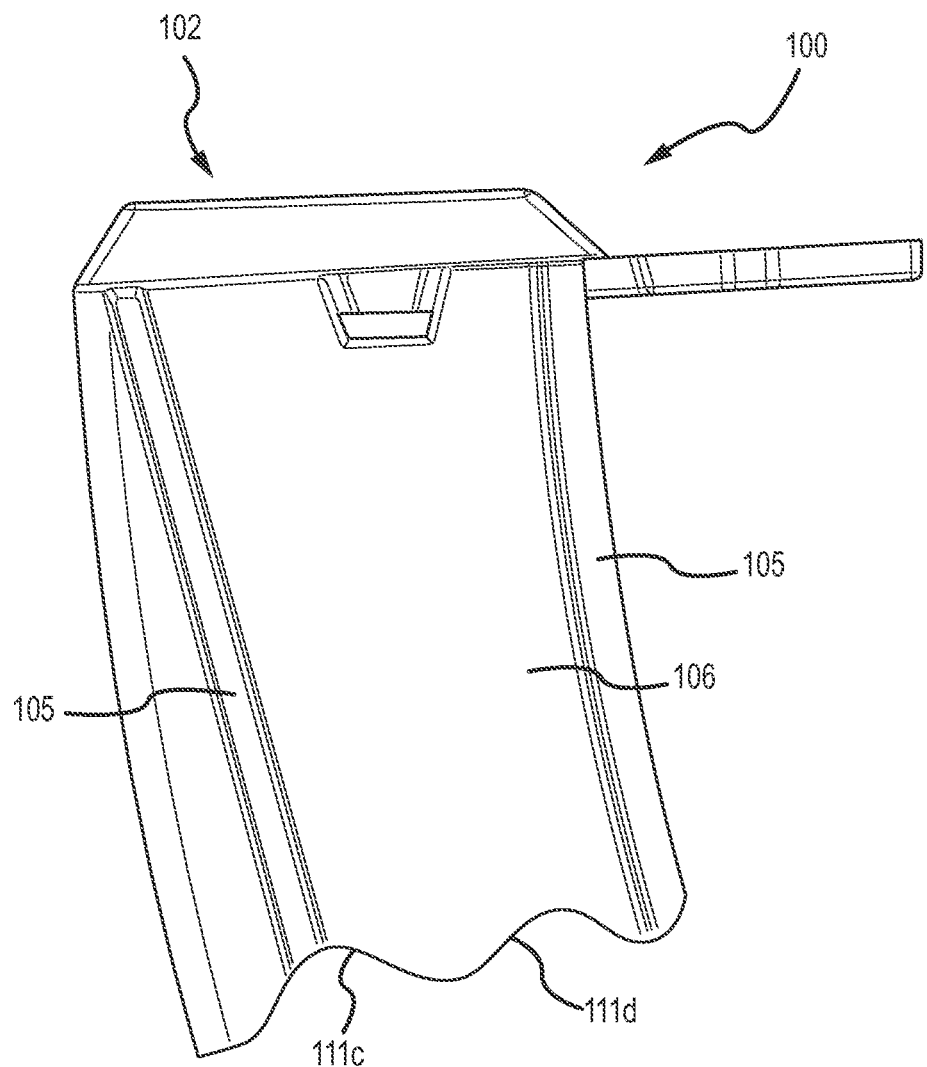
FIG. 5D is a side view illustrating alternative lower portions of a follower according to some embodiments.
Figure 5E:
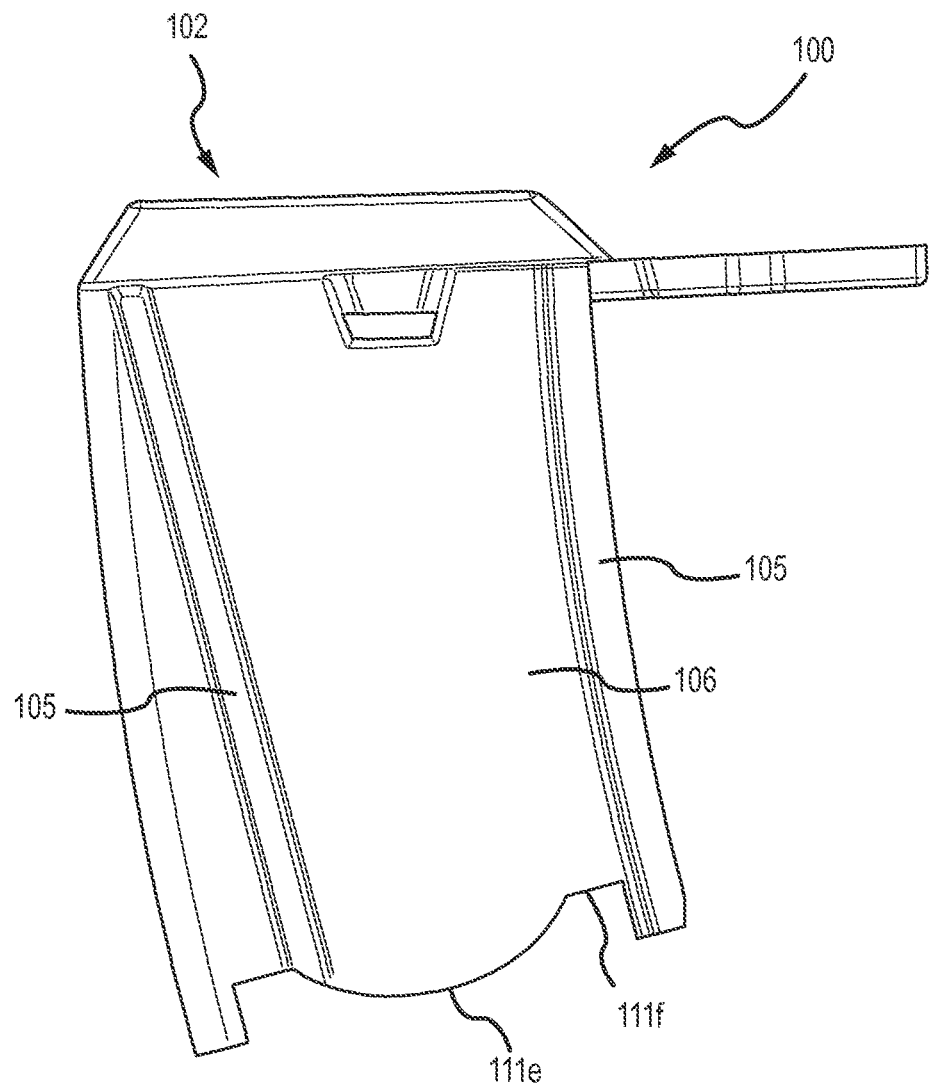
FIG. 5E is a side view illustrating alternative lower portions of a follower according to some embodiments.

In some embodiments, the follower 100, 200 may have one or more side walls 104, 106 or side faces 204, 206 with a lower portion that has a carved out region having a linear and/or nonlinear profile, as illustrated in FIGS. 5B-5E. In some embodiments, the follower 100 may have, for example, a trapezoidal profile 111a as illustrated in FIG. 5B or an angular profile 111b as illustrated in FIG. 5C. In some embodiments, the follower 100 may have a waved profile having a plurality of concave portions 111c, 111d, as illustrated in FIG. 5D. In some embodiments, the follower 100 may have both a convex portion 111e and a linear portion 111f. In some embodiments, a combination of the profiles illustrated in FIGS. 5A-5E may be provided. The embodiments described above and/or combinations thereof may provide a feature to deflect a spring from catching on the follower 100.

Returning briefly to FIG. 2, and with reference to FIG. 4, the follower 100 or plurality of walls may include a back wall 114. The back wall 114 may be shaped to engage an interior of a firearm magazine housing, such as including a curvature (e.g., convex) to match or complement a curvature of a magazine housing, as most clearly seen in FIG. 2. The back wall 114 may have one or more troughs 115a, 115b on the exterior face and/or the interior face of the back wall 114, as illustrated in FIGS. 2 and 4, for allowing debris to pass between the follower 100 and the housing or between the follower 100 and the spring. The back wall 114 may couple at least a portion of the first side face or first side wall 104 to at least a portion of the second side face or second side wall 106.

With continued reference to FIGS. 2 and 4, the back wall 114 may also include a third end 116 opposing the platform 102, and at least one of the first end 108, the second end 110, and the third end 116 may have a spring deflector 118, 120, 122 shaped to deflect a spring from catching on the follower 100 or to translate a lateral spring force into a longitudinal spring force. The spring deflector 118, 120, 122 may include a recessed face shaped to translate a lateral spring force into a longitudinal spring force. Without limitation, in some examples, the recessed face may include an angled lead-in, and/or a variety of beveled or chamfered entries.

Figure 6:
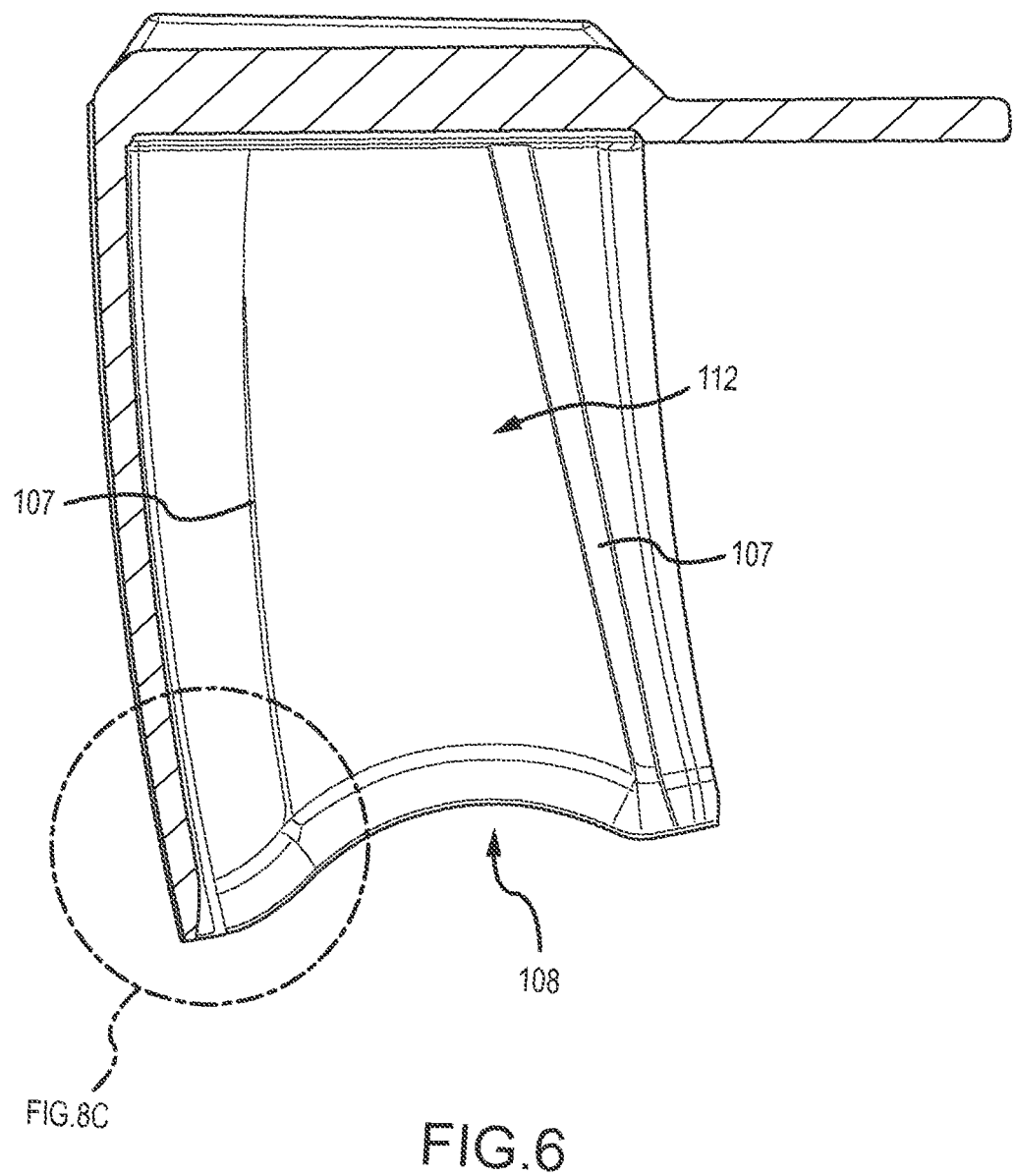
FIG. 6 is a side section view through the center of a follower according to some embodiments.
Figure 7:
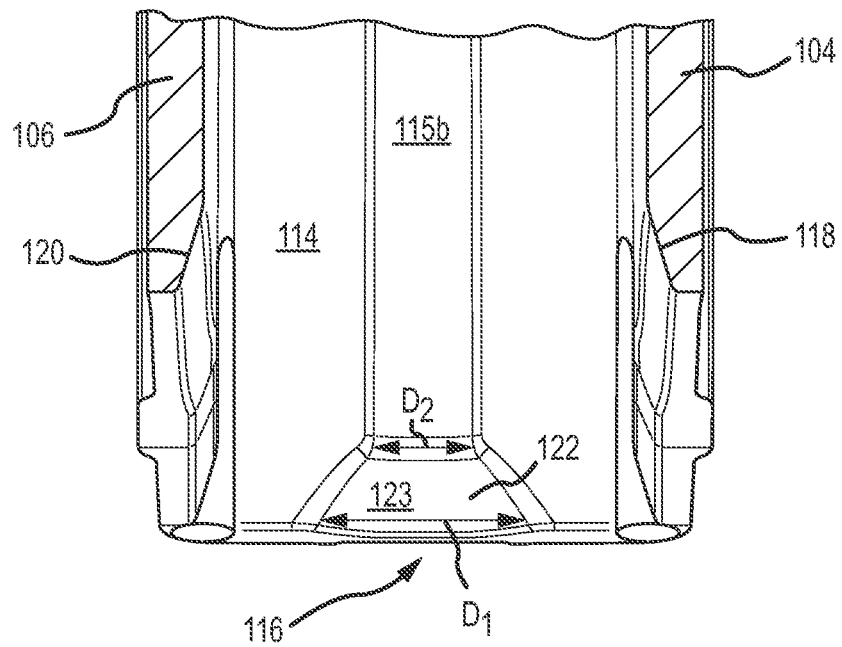
FIG. 7 is a front section view through the center of a follower according to some embodiments.

In some embodiments, and as illustrated in FIGS. 6-7, one or more of the spring deflectors 118, 120, 122 comprises at least one of a bevel, a chamfer, a crimped region, a convex bevel, a concave bevel, a convex chamfer, a concave chamfer, a chisel, a concave chisel, a convex chisel, and a compound bevel to translate a lateral spring force into a longitudinal spring force and/or prevent a spring from catching on the follower 100.

Turning now to FIG. 6, which illustrates a side section view of the follower 100, one or more of the side faces or side walls 104, 106 may have one or more spring guide surfaces 107 to minimize friction between the side faces of the side wall(s) 104, 106 and the spring, thus allowing the spring to compress with as minimal effort as possible within the receiving space 112. In FIG. 6, the spring guide surfaces 107 protrude out of the page, or laterally relative to an interior side face of the side wall 104.

Figure 7A:
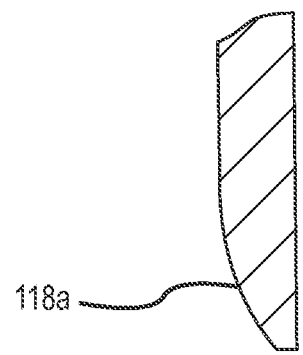
FIG. 7A is a detailed view of an alternative recess in some embodiments.
Figure 7B:
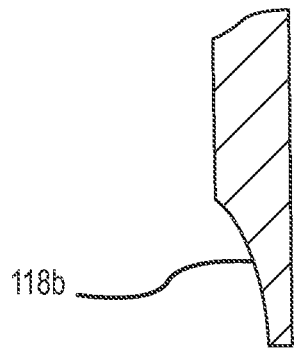
FIG. 7B is a detailed view of another alternative recess in some embodiments.
Figure 7C:
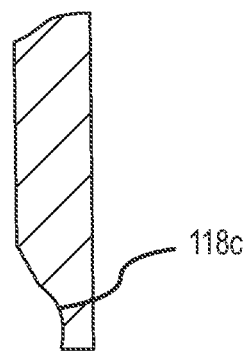
FIG. 7C is a detailed view of another alternative recess in some embodiments.

In some embodiments, as illustrated in FIG. 7A, the spring deflector 118, 120 in the first and/or second side face or side wall 104, 106 may have a convex chamfer 118a. In some embodiments, the spring deflector 118, 120 may have a concave chamfer 118b as illustrated in FIG. 7B, or the spring deflector 118, 120 may have a double chamfer or bevel, as illustrated in FIG. 7C. It should be understood that other shaped walls 104, 106, 114 that provide a wide entry lead-in narrowing to a spring receiving space 112 may be suitable for the spring deflector 118, 120. The wide entry lead-in may provide a minimum cross-section at the follower end upon which a spring could catch. It should also be understood that the spring deflector 118, 120 may include other linear and/or curved surfaces for interfacing with a spring to translate a lateral spring force to a longitudinal spring force.

Turning now to FIGS. 7, 8, and 8A, the spring deflector 122 in the third end 116, that is, the end of the back wall 114, may include a crimped region 123 (see e.g. FIG. 7). The crimped region 123 may be a recess in the back face, such as a recessed face in the back wall 114 that has a large entry or lead-in with a first diameter D1 that narrows to a second diameter D2 when viewed from the bottom of the follower 100. It should be understood that the narrowing from D1 to D2 may be, but is not necessarily, linear. In some embodiments, D2 may have approximately the same dimension as the trough 115 on the interior face of the back wall 114, as seen most clearly in FIG. 7.

Figure 8C:
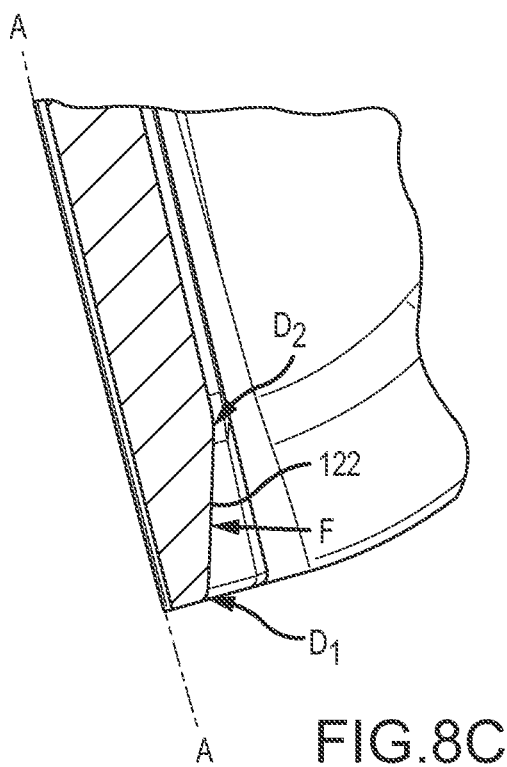
FIG. 8C is a detailed side section view of the recess illustrated in FIGS. 6 and 8.
Figure 8D:
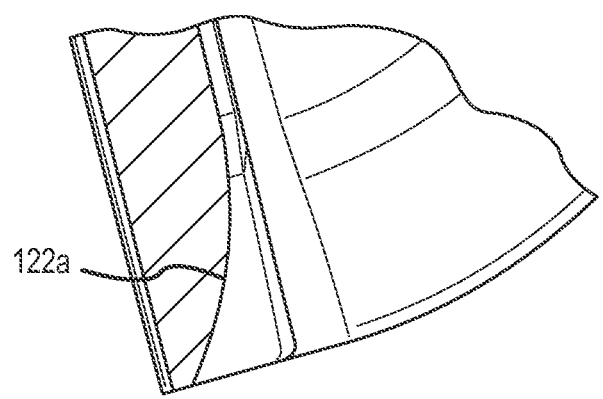
FIG. 8D is a detailed side section view of an alternative recess according to some embodiments.
Figure 8E:
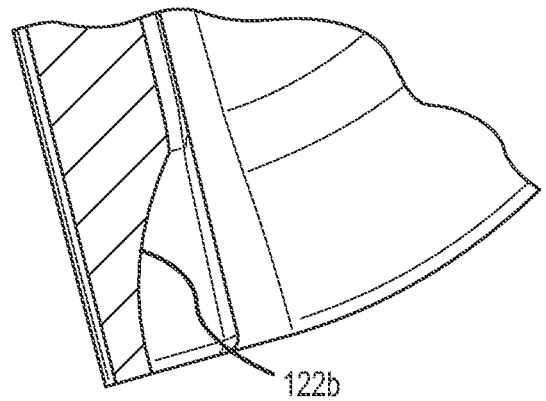
FIG. 8E is a detailed side section view of another alternative recess according to some embodiments.
Figure 8F:
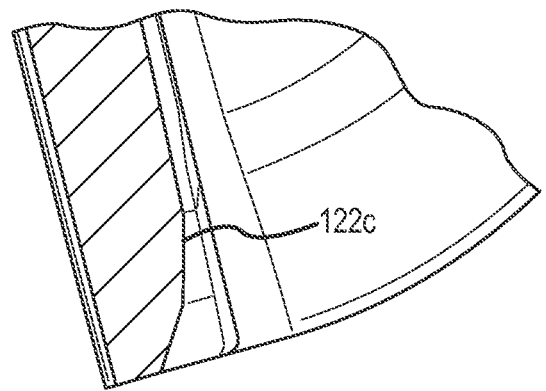
FIG. 8F is a detailed side section view of another alternative recess according to some embodiments.

Turning now to FIG. 8B, which illustrates a detailed side section view taken through the center of the follower in FIG. 6, the recess or spring deflector 122 may include a beveled or crimped region progressing linearly between D1 and D2. In some embodiments, and as illustrated in FIG. 8C, the spring deflector 122a may include a beveled or crimped region that provides a convex surface. In some embodiments, the spring deflector 122b may provide a concave surface as illustrated in FIG. 8D. In some embodiments, the spring deflector 122c may provide a stepped surface, as illustrated in FIG. 8E. It should be understood that other shapes that provide a wide entry or lead-in narrowing to a spring receiving space 112 may be suitable for the spring deflector 122. It should also be understood that the spring deflector 122 may include other linear and/or curved surfaces for interfacing with a spring to translate a lateral spring force into a longitudinal spring force.

Continuing with FIG. 8B, a spring force F is shown, which could be exerted on the follower 100 if the spring is buckling improperly. To counteract this improper spring force F, the spring deflector 122 is shaped to translate the lateral components of the spring force F into longitudinal components. Specifically, the recess on the interior side of the back wall 114 may be angled such that the spring is unable to catch on the follower 100, and such that the spring returns to a properly collapsing shape, because the longitudinal component of the spring force F would be greater than an opposing frictional force. The recess may be manufactured such that the frictional forces between the spring and follower 100 are minimized, thus further improving the effectiveness of the spring deflector 122. Like with the back wall 114, either of the spring deflectors 118, 120 in the first or second side faces or side walls 104, 106 (see e.g. FIG. 5), can eliminate or reduce similarly improper buckling forces through the use of a wide entry lead-in, with further improvement possible through a surface finish that minimizes frictional forces between the spring and the spring deflector(s) 118, 120.

Figure 9:
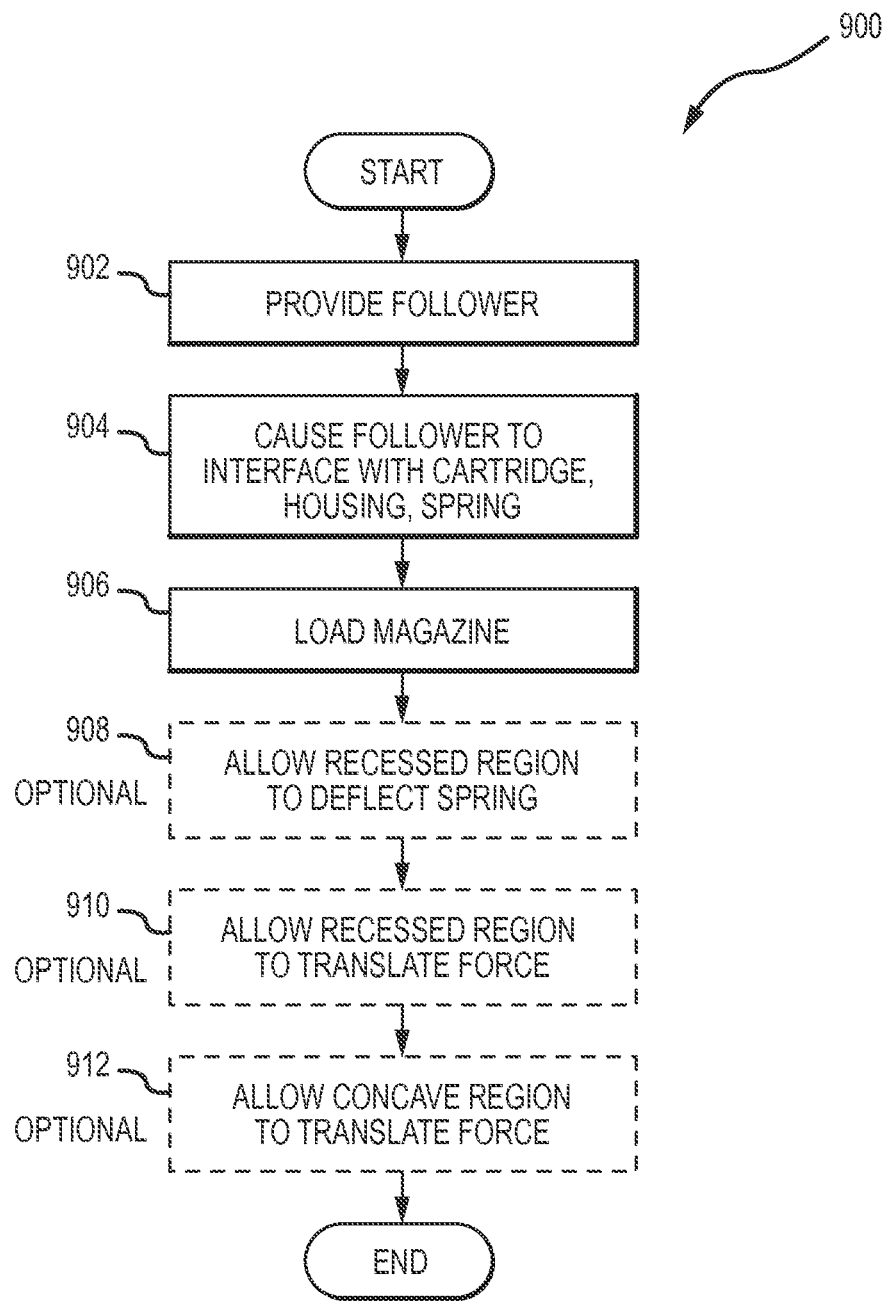
FIG. 9 is a flowchart of a method of using a follower according to some embodiments.

Turning now to FIG. 9, a method 900 of using a follower for a firearm magazine is now described. The method 900 includes providing 902 a follower, causing 904 the follower to interface with a cartridge, housing, and spring, loading 906 a magazine, allowing 908 a recessed face to deflect a spring (optional), allowing 910 a recessed face to translate a force (optional), and allowing 912 a concave region to translate a force (optional).

Providing 902 a follower in a firearm magazine includes providing a follower having a cartridge interface, a magazine housing interface, and a magazine spring receiving space defined by a plurality of walls, the spring receiving space shaped to receive at least a portion of a magazine spring, at least one of the plurality of walls comprising a nonlinear end profile shaped to deflect the magazine spring from catching on the follower. Providing 902 a follower may be achieved by providing a follower according to any of the embodiments described with reference to FIGS. 1-8E.

Causing 904 the follower to interface with a cartridge, a magazine housing, and a magazine spring may include causing an assembled follower to engage or move within a magazine assembly that includes a cartridge, a magazine housing, and a magazine spring.

Loading 906 the firearm magazine includes loading the firearm such that the follower compresses the magazine spring and the nonlinear end profile deflects the magazine spring from catching on the nonlinear end profile. Loading 906 may be achieved by using a follower according to any of the embodiments described with reference to FIGS. 1-8E.

In some embodiments, loading 906 the firearm includes at least one of: allowing 908 a recessed face in at least one of a plurality of walls in the follower to deflect the spring from catching on the wall; allowing 910 a recessed face in at least one of a plurality of walls to translate a lateral spring force into a longitudinal spring force; and allowing 912 a concave region in the nonlinear end profile to translate a lateral spring force into longitudinal spring force.

Figure 10:
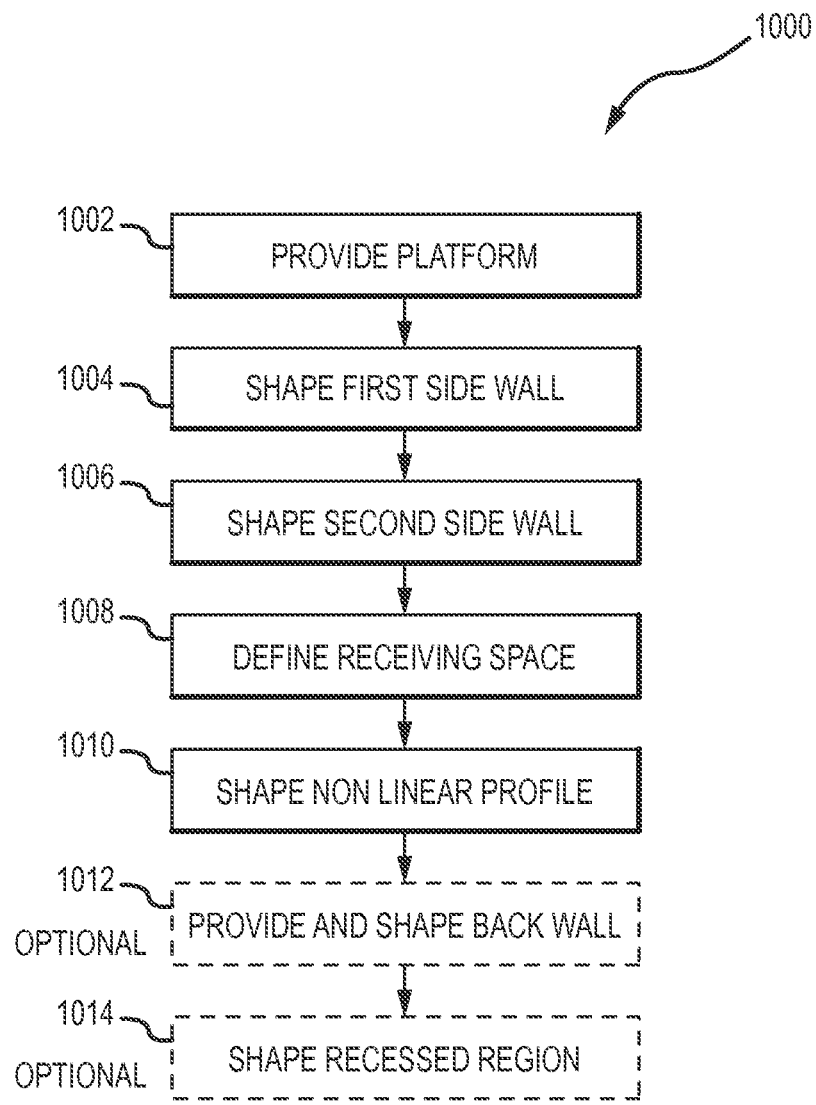
FIG. 10 is a flowchart of a method of manufacturing a follower according to some embodiments.

Turning now to FIG. 10, a method 1000 of making a follower for a firearm is now discussed. The method 1000 includes providing a platform 1002, shaping a first side wall or side face 1004, shaping a second or side face 1006, defining a receiving space 1008, and shaping a nonlinear profile 1010. The method 1000 may optionally include providing and shaping 1012 a back wall, and/or shaping 1014 a recessed or face.

Providing 1002 a platform includes providing a platform shaped to interface with a firearm cartridge, such as a 7.62×39 millimeter cartridge. The platform may be shaped as illustrated in any of the embodiments described with reference to FIGS. 1-8E. Providing 1002 a platform may be accomplished by securing a pre-formed blank and performing finishing operations thereon and/or molding, machining or otherwise manipulating a material, such as, without limitation, high strength synthetic materials, plastics, composites, ceramics, various metals including aluminum, stainless steel or alloys, or any other material suitable for the intended use with a firearm. The platform may have a surface finish suitable to minimize friction between the follower and a magazine housing or cartridge.

Shaping 1004 a first side wall or side face includes shaping a first side wall or side face extending longitudinally from the platform and having a first end opposing the platform. The first side wall or side face may be shaped as illustrated in any of the embodiments described with reference to FIGS. 1-8E. Shaping 1004 may be accomplished by securing a pre-formed blank and performing finishing operations thereon and attaching the first side wall or side face to the platform, and/or molding, machining or otherwise manipulating a material, such as, without limitation, high strength synthetic materials, plastics, composites, ceramics, various metals including aluminum, stainless steel or alloys, or any other material suitable for the intended use with a firearm. The first side wall or side face may have a surface finish suitable to minimize friction between the follower and a magazine housing and/or a spring.

Shaping 1006 a second side wall or side face includes shaping a second side wall or side face extending longitudinally from the platform and having a second end opposing the platform. The second side wall or side face may be shaped as illustrated in any of the embodiments described with reference to FIGS. 1-8E. Shaping 1006 may be accomplished by securing a pre-formed blank and performing finishing operations thereon and attaching the second side wall or side face to the platform, and/or molding, machining or otherwise manipulating a material, such as, without limitation, high strength synthetic materials, plastics, composites, ceramics, various metals including aluminum, stainless steel or alloys, or any other material suitable for the intended use with a firearm. The second side wall or side face may have a surface finish suitable to minimize friction between the follower and a magazine housing and/or a spring.

Defining 1008 a receiving space includes shaping the first side wall or side face and the second side wall or side face to define a receiving space for receiving at least a portion of a magazine spring. The receiving space may be shaped as illustrated in any one of the embodiments described with reference to FIGS. 1-8E.

Shaping 1010 a nonlinear profile includes shaping a nonlinear profile in at least one of the first end and the second end, the nonlinear profile having a concave portion. Shaping 1010 may be achieved by performing finishing operations on at least one of the first end and the second end and/or molding, machining or otherwise manipulating the first and/or second side wall or side face. Shaping 1010 a nonlinear profile may be accomplished by providing a nonlinear profile as described with reference to FIGS. 1-8E.

The method 1000 may include providing and shaping 1012 a back wall. Providing and shaping 1012 includes providing a back wall that couples at least a portion of the first side wall or face to at least a portion of the second side wall or side face, the back wall comprising a third end opposing the platform, and shaping the back wall for engagement with an interior of a firearm magazine housing. Providing and shaping 1012 a back wall may be achieved by molding, machining or otherwise manipulating a material that couples the first and/or second side wall or side face and/or performing finishing operations on at least a portion of the back wall. Providing and shaping 1012 a back wall may be accomplished by providing a back wall as described with reference to FIGS. 1-8E.

The method 1000 may include shaping 1014 a recessed region or face in at least one of the first end and the second end to configure the at least one of the first end and the second end to deflect a spring from catching on the at least one of the first end the second end, wherein shaping a recessed region or face comprises at least one of chamfering and beveling at least a portion of the at least one of the first end and the second end. Chamfering and beveling may be achieved through molding, machining, and/or other finishing operations suitable for achieving a recessed region or face. Shaping 1014 may be achieved by providing a recessed region or face as described with reference to any of FIGS. 1-8E.

In conclusion, the present invention provides, among other things, a system and method for preventing a spring from catching on the follower or twisting in the housing. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A follower for a firearm magazine having a spring therein, the follower comprising:
   a platform having a top surface shaped to interface with a firearm cartridge and a bottom surface shaped to seat the spring in the firearm magazine;
   a first side face extending longitudinally from the platform and having a first end opposing the platform; and
   a second side face extending longitudinally from the platform and having a second end opposing the platform; wherein
   the first side face and the second side face define a receiving space for receiving at least a portion of a magazine spring;
   at least one of the first end and the second end has a nonlinear profile having at least one concave portion whereby the at least one of the first end and the second end is configured to translate a lateral spring force exerted by the spring onto the at least one of the first end and the second end into a longitudinal spring force onto the bottom surface.

2. The follower of claim 1, further comprising:
   at least one wall defining the first side face, the second side face, and a back face, the back face comprising a third end opposing the platform, and wherein
   at least one of the first end, the second end, and the third end comprises a spring deflector shaped to deflect the spring from catching on the follower.

3. The follower of claim 2, wherein:
   the spring deflector comprises a recessed face shaped to translate a lateral spring force exerted by the spring onto the at least one of the first end, the second end, and the third end into a longitudinal spring force onto the bottom surface.

4. The follower of claim 2, wherein:
   the spring deflector comprises a crimped region in the third end.

5. The follower of claim 1, wherein:
   at least one of the first end and the second end comprises a spring deflector shaped to deflect the spring from catching on the at least one of the first end and the second end.

6. The follower of claim 5, wherein:
   the spring deflector comprises a recessed face whereby the spring deflector is configured to translate a lateral spring force exerted by the spring onto the at least one of the first end or the second end into a longitudinal spring force onto the bottom surface.

7. The follower of claim 6, wherein:
   the spring deflector comprises at least one of a relief entry, an angled lead-in, a bevel, a chamfer, a crimped region, a convex bevel, a concave bevel, a convex chamfer, a concave chamfer, a chisel, a concave chisel, a convex chisel, and a compound bevel.

8. The follower of claim 5, wherein:
   the at least one of the first end and the second end comprises a nonlinear profile, the nonlinear profile comprising a concave portion; and
   the concave portion comprises the spring deflector.

9. The follower of claim 1, wherein:
   the nonlinear profile comprises a concave portion in a fore region of the at least one of the first end and the second end and a convex portion in the fore region of the at least one of the first end and the second end, the convex portion forward of the concave portion, the convex portion having a radius of curvature that is less than a radius of curvature of the concave portion.

10. A follower for a firearm magazine, the follower comprising:
    a cartridge interface shaped to support a cartridge in a firearm magazine;
    a magazine housing interface shaped to orient the follower relative to the firearm magazine; and
    a magazine spring receiving space shaped to receive at least a portion of a magazine spring, at least a portion of the magazine spring receiving space comprising a spring deflector comprising a crimped region configured to translate a lateral spring force into a longitudinal spring force.

11. The follower of claim 10, comprising:
    a nonlinear end profile comprising at least one concave region.

12. The follower of claim 10, wherein:
    the spring deflector is shaped to deflect the spring from catching on the magazine housing interface.

13. A method of using a follower for a firearm magazine, the method comprising:
    providing a follower in a firearm magazine, the follower having a cartridge interface, a magazine housing interface, and a magazine spring receiving space shaped to receive at least a portion of a magazine spring, at least a portion of the magazine housing interface comprising a plurality of interior faces and a nonlinear end profile shaped to deflect the magazine spring from catching on the follower, the nonlinear end profile having a concave portion in a fore region of the follower and a convex portion forward of the concave portion, the convex portion having a radius of curvature that is less than a radius of curvature of the concave portion;
    causing the follower to interface with a cartridge, a magazine housing, and a magazine spring; and loading the firearm magazine such that the follower compresses the magazine spring and the nonlinear end profile deflects the magazine spring from catching on the nonlinear end profile.

14. The method of claim 13, wherein loading the firearm comprises:
allowing a crimped region in at least one of the plurality of interior faces to deflect the spring from catching on the magazine housing interface.

15. A method of making a follower for a firearm, the method comprising:
providing a platform shaped to interface with a firearm cartridge;
shaping a first side face extending longitudinally from the platform and having a first end opposing the platform; and
shaping a second side face extending longitudinally from the platform and having a second end opposing the platform;
shaping the first side face and the second side face to define a receiving space for receiving at least a portion of a magazine spring; and
shaping a nonlinear profile in at least one of the first end and the second end, so that the nonlinear profile has a concave region configured to translate a lateral spring force into a longitudinal spring force.

16. The method of claim 15, further comprising:
providing a back wall coupling at least a portion of the first side face to at least a portion of the second side face, the back wall comprising a third end opposing the platform;
shaping the back wall for engagement with an interior of a firearm magazine housing; and
shaping a recessed face in at least one of the first end, the second end, and the third end to deflect a spring from catching on the follower;
wherein shaping a recessed face comprises crimping at least a portion of the at least one of the first end, the second end, and the third end.

17. The method of claim 15, comprising:
shaping a recessed face in at least one of the first end and the second end to configure the at least one of the first end and the second end to deflect a spring from catching on the at least one of the first end the second end;
wherein shaping a recessed face comprises at least one of chamfering and beveling at least a portion of the at least one of the first end and the second end.

* * * * *